United States Patent [19]

Kavick

[11] 4,099,748
[45] Jul. 11, 1978

[54] HOSE COUPLING ASSEMBLY

[75] Inventor: Edward M. Kavick, Chardon, Ohio

[73] Assignee: Samuel Moore and Company, Aurora, Ohio

[21] Appl. No.: 741,372

[22] Filed: Nov. 12, 1976

[51] Int. Cl.² ............................................. F16L 33/20
[52] U.S. Cl. ..................................... 285/256; 285/318
[58] Field of Search ............... 285/244, 248, 256, 116, 285/251, 254, 318; 403/285, 284, 274

[56] References Cited

U.S. PATENT DOCUMENTS

| 2,121,624 | 6/1938 | Cowles | 285/256 |
| 2,250,286 | 7/1941 | White | 285/256 |
| 2,449,916 | 9/1948 | Tandet | 285/259 |
| 2,452,908 | 11/1948 | Cowles | 285/259 X |
| 2,679,409 | 5/1954 | Spender et al. | 285/257 |

Primary Examiner—Dave W. Arola
Attorney, Agent, or Firm—Clelle W. Upchurch

[57] ABSTRACT

A hose and tube coupling assembly provided with a coiled insert between the outer surface of the hose or tube and the coupling member. The coiled insert has a plurality of coils and is provided with circumferentially spaced longitudinal members secured to at least a portion of the coils to provide transverse means of securing a spaced relationship between the secured coils during installation and use of the coupling member.

12 Claims, 10 Drawing Figures

HOSE COUPLING ASSEMBLY

This invention relates generally to a hose and tube coupling member assembly and more particularly to an improved hose and tube coupling member assembly having a coiled insert between the outer surface of the hose or tube and the coupling member.

BACKGROUND OF THE INVENTION

It has been proposed before to incorporate a coiled spring into a hose or tube coupling assembly and to compress the spring so that it exerts a pressure on the tube or hose. Examples of such products are disclosed in U.S. Pat. No. 2,561,827 which discloses a wire grip consisting of a plurality of convolutions of wound wire and in U.S. Pat. No. 3,008,736 which discloses a flat wire spring having an inner diameter slightly smaller than the tubing or hose diameter over which it is mounted and in U.S. Pat. No. 3,295,872 which discloses a rod-like coil spring with its end secured and in Japanese Patent Publication No. Sho 50- 27924 which discloses a metal spring between a coupling shell and outer covering of a hose. It has also been proposed in U.S. Pat. Nos. 2,121,624 and 3,690,704 to threadingly engage a coil spring in hose coupling assemblies. The disclosed products, however, have the disadvantage that they do not provide means for minimizing warpage or displacement of the coils, particularly when subjected to compressive forces substantially normal to the central axis thereof, related to coupling assembly contemplated by this invention and the further disadvantage, in many cases, of requiring costly machining of the inner surface of the coupling member in contact with the coil spring member.

SUMMARY OF THE INVENTION

It is an object of this invention to provide an improved coupling member to be secured to the end of a hose or tube. It is another object to provide an assembly of a hose or tube and a coupling member adapted to be used at high pressures without separation of the coupling member from the hose or tube. It is still another object to provide a coupling member having an improved structure for securing the coupling member to the end of a hose or tube. It is yet another object to provide a coupling member having a coil insert member provided with means for minimizing coil distortion or displacement during installation and use of the coupling member. It is yet a further object to provide a coupling member having a coil insert member provided with means of minimizing coil distortion or displacement when subject to compressive forces substantially normal to the longitudinal axis of the coil insert member. It is still a further object of this invention to provide a coupling member assembly having a coil insert member provided with means for positioning the coil member upon the hose or tube to be coupled during the coupling installation process. It is yet another object of this invention to provide means for conditioning an end portion of a coil member used in a hose or tube coupling assembly so as to reduce any damage caused thereby to any hose or tube surface it may be placed upon.

BRIEF DESCRIPTION OF THE DRAWINGS

Other objects will become apparent from the following description with reference to the accompanying drawing in which.

DESCRIPTION OF PREFERRED EMBODIMENTS

Figure 1:
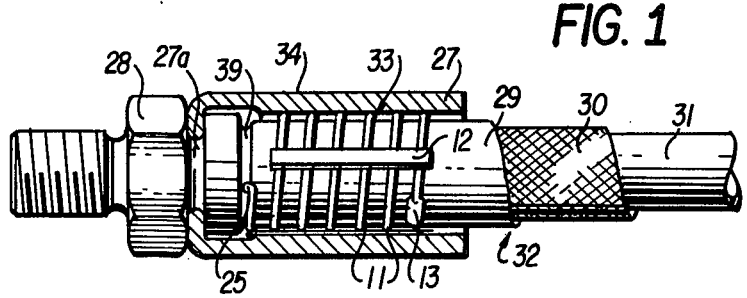
FIG. 1 shows a cut-away side elevation of a preferred embodiment having positioning means prior to compression of the outer shell member of a coupling.

FIG. 1 shows a preferred embodiment of a permantly attached coupling assembly 34 comprising compressive member shown as shell portion 27 secured at one end thereof to body member 28, pintle member 39 extends from body member 28 and is partially inserted (for purpose of illustration) into bore of hose 32 which comprises outer covering 29 disposed about reinforcement 30 which is disposed about core tube 31. Compressive member or shell 27 is disposed radially from the outer surface of hose covering 29 and is secured at one end thereof to body member 28 such as, for example, by turning the end of shell 27 inwardly and crimping it into a groove 27a. Improved coil insert member 33 having coils 11, longitudinal members 12 secured thereto, coil end flattened conditioning means 13 and coil end positioning means 25 is disposed between the inner surface of compressive member 27 and outer covering 29 of hose 32.

It is preferred that the inner diameter of coils 11 of coil insert member 33 fit snugly over the outside diameter of hose cover 29 upon assembly and that inwardly directed coil end 25 not be closer to the central axis of hose 32 than the inner diameter of core tube 31. In the example shown in FIG. 1, the coil insert member 33 is placed about the end of the hose 32 until coil end portion 25 makes a contact relationship therewith. Coupling 34 is placed over the end of hose 32 wherein suitable clearance is provided between the outer diameter of coil insert member 33 and the inner surface of shell 27. Upon suitable positioning of coupling 34, shell 27 is compressed by suitable means such as, for example, crimping or swaging. The compressive forces of attachment are transferred to hose 32 through coil insert member 33 which, because of secured spaced relationship provided by transverse members 12, minimizes coil distortion and displacement and provides an improved means of distributing the forces of attachment in a more uniform manner. Although FIG. 1 shows a coupling assembly capable of being permanently attached to a hose, it is to be understood that the coupling may also be a reusable type wherein the forces of attachment are normally produced by rotatable nut means or the like providing compressive forces substantially normal to the longitudinal axis of the coil insert member.

Figure 2:
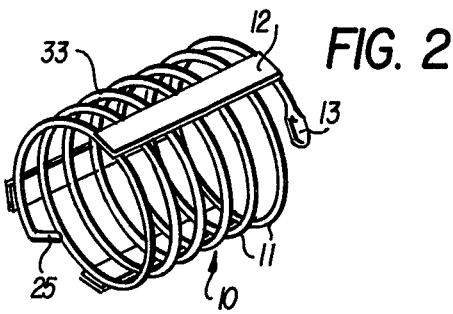
FIG. 2 is a perspective view of one embodiment of the invention.

FIG. 2 shows an embodiment of coil insert member 10 having a plurality of coils 11 that are provided with a spaced relationship between coils by means of a plurality of longitudinal securing members 12. Coils 11 may be of any suitable cross-sectional shape such as, for example, circular or rectangular. A preferred embodiment is where coils 11 are substantially circular; such as found in a conventional spring wire coil. Coils 11 may be made of any suitable material. They may be made, for example, from filled or unfilled polymeric materials or metal. A preferred embodiment is where coils 11 are made from a suitable metal such as normally provided in helically wound spring wire.

Longitudinal members 12 may be made from any suitable material such as filled or unfilled polymeric materials or metal. The material chosen for coil 11 may be different from that chosen for transverse member 12 such as, for example, coil 11 being made from metal and longitudinal member 12 being made from a polymeric material. Longitudinal member 12 may be fixedly attached to coils 11 such as by brazing, soldering, welding, heat fusion, solvent welding, bonding and the like, dependent upon the materials chosen therefore.

Figure 5:
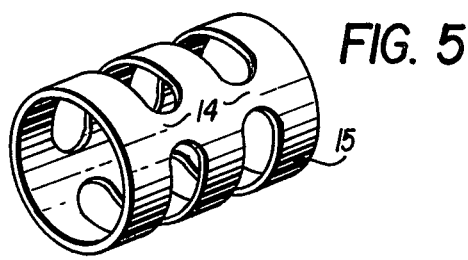
FIG. 5 shows a perspective view of another embodiment of the invention.
Figure 6:
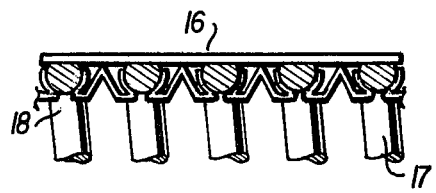
FIG. 6 shows a cut-away side elevation of yet another embodiment of the invention.

A preferred embodiment is where coils 11 and longitudinal member 12 are both made of metal and are fixedly attached to each other by resistance welding. FIG. 5 shows another embodiment where there may be an integral relationship between coil 15 and longitudinal member 14. The embodiment shown in FIG. 5 may, for example, be made from a polymeric material or a metallic material. FIG. 6 shows a removably attached longitudinal member 16 having shaped attachment means 18 for securing coils 17 in a spaced relationship. As in the previous embodiments described, members 16 and 17 of FIG. 6 may be made from either polymeric or metallic materials.

Figure 7:
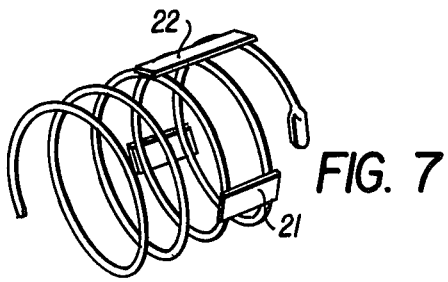
FIG. 7 shows a perspective view of yet another embodiment of the invention.
Figure 8:
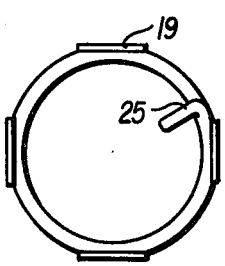
FIG. 8 shows an end view of another embodiment of the invention.

Returning to FIG. 2, longitudinal member 12 may be aligned with the central axis of coil insert member 10, as shown, or it may be in any suitable transverse relationship to coil 11. Although one or more longitudinal members 12 may be used, such as the four longitudinal members 19 shown in FIG. 8, it is preferred to use three equally circumferentially spaced longitudinal members such as members 12 and 20 shown in FIGS. 2 and 4 respectively. Although it is preferred that longitudinal members be co-extensive with substantially the full length of the coil member, they may provide transverse means of providing a spaced relationship for only a portion of the coils and/or of different lengths as shown in members 21 and 22 of FIG. 7 and member 23 and 24 of FIG. 3.

Figure 3:
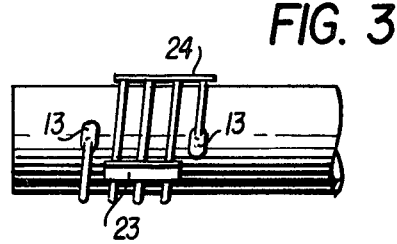
FIG. 3 is a side elevation of another embodiment of the invention.
Figure 4:
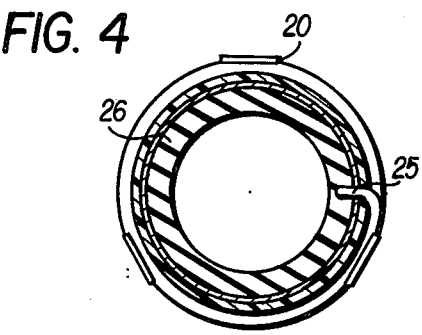
FIG. 4 shows an end view of another embodiment wherein an end coil is directed inwardly to provide a positioning means against an end of a tube or hose.
Figure 9:
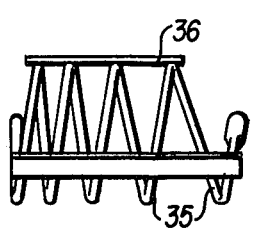
FIG. 9 shows a side elevation of yet another embodiment of the invention.
Figure 10:
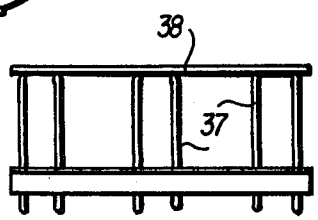
FIG. 10 shows a side elevation of another embodiment of the invention.

Also shown in FIGS. 1, 2, and 3, is a preferred embodiment wherein either one or both ends 13 of the coil insert member may be provided with a means of preventing any sharp end thereof from damaging the outer surface of tubing or hose it is placed thereupon by conditioning the end, for example, by rounding, flattening, smoothing, capping, heating and the like. A preferred embodiment is also shown in FIGS. 1 and 4 wherein end portion 25 of coil insert member 20 is directed inwardly towards the central axis thereof and provided a contact relationship with tubing end-portion 26. FIG. 9 illustrates another embodiment wherein coils 35 are not required to be evenly spaced when in contact relationship with longitudinal members 36 and FIG. 10 illustrates yet another embodiment wherein circular members 37 are separated and not continuous helical windings and are secured in a spaced relationship by means of transverse members 38.

It has been found that a conventioanl helically-wound spring coil, when used in a permanently attached coupling assembly, will tend to distort and result in a movement of bunching of the coils in an area of the coupling closest to the tube or hose end, commonly called the bell region, when the coupling assembly shell is compressed for attachment to the tube or hose. It has been observed, particularly in the case where compessive forces substantially normal to the central longitudinal axis of the coil insert member are involved, that such distortion or displacement of the coils results in lowered performance characteristics caused by what is believed to be non-uniform distribution of the forces of attachment caused by distortion and displacement of the coils.

An example of improved performance of a hose coupling assembly having an improved coil insert member contemplated within this invention in comparison to one having a conventional coil member and one without a coil member is shown where a ½ inch inside diameter hose having a nylon core, a first braided layer of fibrous reinforcement disposed about the core tube, a second lapped layer of fibrous reinforcement disposed about the first braided layer, a third braided layer of fibrous reinforcement disposed about the second layer and a protective polyurethane sheath disposed about the third braided layer. The hose described has an outside of diameter of aout 1.040 inches and a permanently attachable coupling is placed thereupon having a shell with a 1½ inch outside diameter, a length of 2¾ inch and a .109 inch wall thickness and swaged to a 1.120 inch diameter under the following conditions and results:

|  | No Coil Member | Conventional Coil Member | Improved Coil Member |
| --- | --- | --- | --- |
| Type of Coil | — | helical wound spring wire | helical wound spring wire |
| Diameter of Wire | — | .094 inches | .094 inches |
| Axial Length of Coil Member | — | 1¾ inches | 1¾ inches |
| Number of Coils | — | 7 | 7 |
| Space between Coils | — | .160 inch | .160 inch |
| Transverse Members | — | None | 4 |
| Transverse Type | — | — | bar |
| Transverse Attachment Means | — | — | brazed |
| Transverse Length | — | — | full |
| Hose Burst at 200° F. (p.s.i.) | 19,000 Coupling Blew Off | 25,500* Coupling Blew Off | 26,500 Good Hose Burst |

*Some Coils found to be bunched in bell region of coupling after examination.

The above illustrates one of the advantages provided by an improved hose or tube coupling member assembly having a coil insert member provided with transverse means for securing a spaced relationship between coils wherein coils are prevented from bunching in the bell region of the coupling and fitting retention ability is greatly improved.

The coupling and coiled insert member provided by the invention may be secured to the end of any hose adapted to conduct fluid under pressure such as the hoses disclosed in U.S. Pat. Nos. 3,062,241; 3,116,760; 3,604,461; 3,722,550; and 3,905,398, the disclosures of which are incorporated herein by reference, or a hose having a rubber sheath and/or core tube or a hose having metallic wire reinforcement along with or instead of fibrous reinforcing material.

Although the invention has been described in detail for the purpose of illustration, it is to be understood that transverse means of securing a spaced relationship between at least a portion of the coils of an improved coil insert member, as herein described, may also include, among other variations, and means as being in whole or in part related to the inner contacting surface of the compressable or tightening member surrounding the coil insert member in a tube or hose coupling assembly and that such detail is solely for that purpose and that variations can be made therein by those skilled in the art without departing from the spirit and scope of the invention except as it may be limited by the claims.

What is claimed is:

1. A coupling adapted for use on the end of a hose or tube comprising a body member, a pintle member extending from the body member and having a central longitudinal axis therethrough, a compressive member disposed in encompassing relationship about the pintle member and secured at one end thereof to the body member, a coil insert member disposed between the compressive member and the pintle member, said coil insert member comprising a plurality of coils disposed about the pintle member and which completely encircle the pintle member while in a radially uncompressed state prior to attachment of the coil insert member to the hose or tube, said coils having an inner diameter thereof disposed radially outwardly substantially equi-distant from the longitudinal axis of the pintle member for a distance from the outer surface of the pintle member sufficient to permit insertion therebetween of the wall of a hose or tube to which the coupling is to be attached, and said coils having at least a portion thereof secured in a spaced-apart relationship to each other by means of a plurality of circumferentially-spaced longitudinally extending members which extend between at least a portion of the coils to prevent warpage thereof and to more uniformly distribute the radially inwardly compressive force transferred to the coils as a result of compressing the compressive member radially inwardly during the process of attaching the coupling to the hose or tube.

2. The coupling of claim 1 wherein the longitudinal members in secured relationship comprises a fixedly attached relationship.

3. The coupling of claim 1 wherein the longitudinal members in secured relationship comprises a removably attached relationship.

4. The coupling of claim 1 wherein the longitudinal members in secured relationship comprises an integral relationship.

5. The coupling of claim 1 wherein the coil insert member contains means for positioning said member upon the end of a hose or tube to be attached to the coupling member.

6. The coupling of claim 5 wherein said positioning means comprises a coil-end directed towards the central longitudinal axis of the coil insert member providing a stopping means against the end of the hose or tube upon which it is placed.

7. The coupling of claim 1 wherein the coil insert member contains means for preventing damage to a hose or tube it is placed upon comprising means for conditioning any sharp coil-end related thereto.

8. A hose and tube coupling assembly comprising a hose or tube having a bore therein, a coupling member attached to at least one end of the hose or tube comprising a body member, a pintle member having a central longitudinal axis therethrough extending from the body member and disposed in the bore of the hose or tube, a compressive member disposed in encompassing relationship about the outer surface of the hose or tube and secured at one end thereof to the body member, a coil insert member disposed between the outer surface of the hose or tube and the compressive member, said coil insert member comprising a plurality of coils which completely encircle the hose or tube outer surface while in a radially uncompressed state prior to attachment thereof to the hose or tube, said coils having an inner diameter thereof disposed radially outwardly substantially equi-distant from the longitudinal axis of the pintle member such that the coils fit snugly about the outer surface of the hose or tube wall inserted between the outer surface of the pintle member and the coils, and said coils having at least a portion thereof secured in a spaced-apart relationship to each other by means of a plurality of circumferentially-spaced longitudinally extending members which extend between at least a portion of the coils to prevent warpage thereof and to more uniformly distribute the radially inward compressive force transferred to the coils as a result of compressing the compressive member radially inwardly during the process of attaching the coupling to the hose or tube.

9. The hose and tube coupling assembly of claim 8 wherein the coil insert member contains means for positioning said member upon the end of a hose or tube.

10. The hose and tube coupling assembly of claim 9 wherein said positioning means comprises a coil-end directed towards the central longitudinal axis providing a stopping means against the end of the hose or tube.

11. The hose and tube coupling assembly of claim 8 wherein the coil insert member contains means for preventing damage to the hose or tube comprising means for conditioning any sharp coil-end related thereto.

12. A hose and tube coupling assembly comprising a hose adapted to conduct fluids under pressure and on one end thereof a metallic fitting member for attaching the hose to a source of fluid under pressure, said hose having an outer sheath, a core tube and fibrous material reinforcing the core tube disposed between a core tube and the sheath, said fitting having a body portion and a pintle inserted in the bore of the hose and extending from the body portion, an annular groove in the body portion and a shell disposed about the sheath of the hose and having one end secured to the said groove to secure the shell to the body portion, a coiled metal wire member disposed between the hose and the shell having a central longitudinal axis therethrough that is substantially aligned with the central longitudinal axis of the hose, shell and pintle and having a plurality of continuous wire coils disposed in substantially transverse relationship to the central longtiudinal axis of the coiled wire member that are connected by means of longitudinally extending bars spaced circumferentially about the coils and secured to at least a portion thereof to maintain the spacing between convolutions of the coiled wire, said shell being compressed such that the hose between the coiled member and the pintle secures the fitting member on the hose end.

* * * * *